3,389,053
EXPANDED BED NUCLEAR REACTOR FUEL MODULE

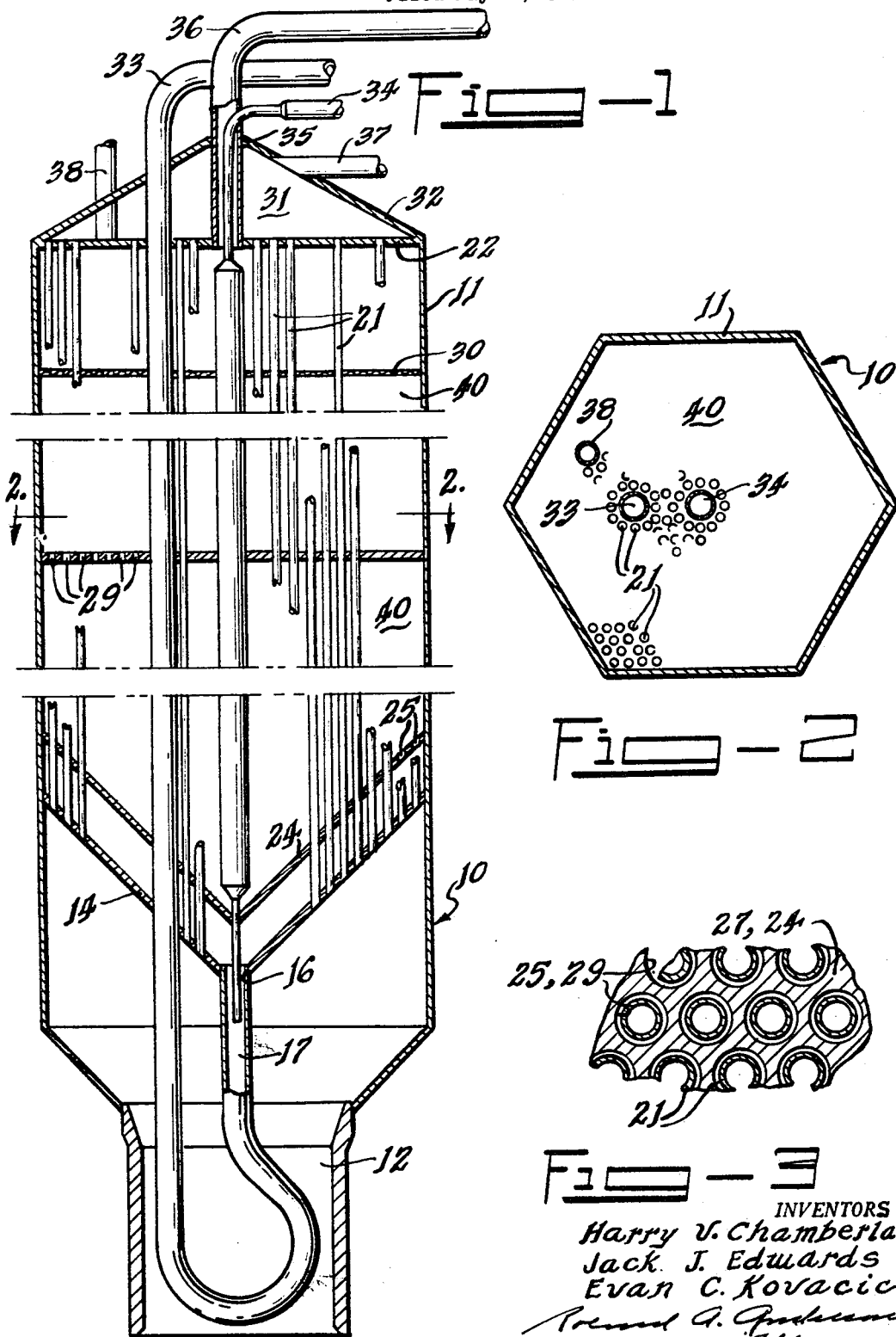

Harry V. Chamberlain, Royal Oak, Jack J. Edwards, Southfield, and Evan C. Kovacic, Trenton, Mich., assignors to the United States of America as represented by the United States Atomic Energy Commission
Filed May 25, 1967, Ser. No. 643,025
10 Claims. (Cl. 176—32)

ABSTRACT OF THE DISCLOSURE

A dispersion of fuel particles in a liquid metal is present as an expanded bed on the shell side and a liquid metal coolant present on the tube side in a fuel module which is a shell and tube heat exchanger. Baffles are provided to prevent rapid collapse of the expanded bed and to establish an axial temperature gradient in the bed and an eductor is employed for discharge of the bed from the module.

Contractual origin of the invention

The invention described herein was made in the course of, or under, a contract with the United States Atomic Energy Commission.

Background of the invention

This invention relates to a fuel module for a fast breeder reactor and more particularly to a reactor in which the fuel is in the form of discrete particles in an expanded bed.

The future of electrical power produced by nuclear reactors appears to reside in the development of breeder reactors. Breeder reactors produce more usable fuel than they consume. The fuel in a breeder reactor may consist of uranium–235 or plutonium–239 or a combination thereof as major constituents of a core surrounded by a blanket containing uranium–238. During operation of the reactor, uranium–238 in the blanket is converted to plutonium–239 which then may be used as core material. Eventually both the core and the blanket must be reprocessed in order to recover the unused fissile material from the core and the newly produced fissile material in the blanket.

There are several problems in the design and operation of a breeder reactor that had not been encountered with other reactors. In a breeder reactor, large amounts of plutonium are intentionally produced for recovery and processing into fuel. Since plutonium is one of the deadliest elements known to mankind, extraordinary safety precautions must be used when handling large amounts of this material. As a result of this requirement, practically all of the reprocessing operations are performed entirely by automation behind heavy radiation shielding. Because these operations are remotely controlled and plutonium is so dangerous, breakdown in the equipment presents a much more serious problem in plutonium reprocessing than it does in uranium–235 or irradiated uranium–238 reprocessing.

Another problem encountered with breeder reactors is in the choice of coolant. One of the few materials that can be used is liquid sodium, but it is opaque, becomes highly radioactive upon exposure to radiation and is extremely corrosive in the presence of impurities such as oxygen.

When conventional fuel elements, consisting of a fissile core surrounded by a cladding material, are used in a sodium-cooled reactor, fission products produced during irradiation present an additional problem. Conventional fuel elements generally operate at very high temperatures so that fission gases and volatile liquid and solid fission products produced by irradiation boil off of the fissile core in the fuel element and collect inside the cladding. Fuel elements must be designed for collection of these fission products which results in impaired heat transfer between the fissile core and the coolant. If the cladding fails, the fission products vent to the sodium coolant and may cause further problems if the reactor is not specifically designed to cope with them.

The modules which make up the reactor of the present invention may be used either as a core, a blanket or both. They are particularly well adapted for use as a blanket but they also can be used as a core since reactivity changes in the bed during fluidization are slight. A nuclear reactor will consist of a plurality of modules each of which is in essence a shell and tube heat exchanger. The coolant, a liquid metal such as sodium, is present on the tube side and the fuel, a mixture of plutonium and uranium-containing particles, is present as an expanded bed on the shell side. An expanded bed is produced when the velocity of a fluidizing medium is sufficient to cause the bed particles to separate and move around in the bed but not sufficient to effect vigorous boiling. It should be noted that according to this invention the fluidizing medium does not act as a coolant; in fact less than 1% of the heat produced is lost to the fluidizing medium. This arrangement has several distinct advantages.

There are no conventional fuel elements, hence there is no cladding to break down with the corresponding problems discussed above. The particles themselves operate at a much lower temperature than does a conventional fuel element because the boiling point of the fluidizing medium is a limitation on the temperature of the system. Because of the low operating temperature of the particles as compared to the core in a conventional fuel element, a lesser amount of the volatile liquid and solid fission products produced in the particles during irradiation boil off the particles and vent to the fluidizing medium. In addition, the individual fuel particles are easy to prepare and reprocess. Since there is no cladding to be removed, both fuel preparation and reprocessing are cheaper.

With the fuel in the form of discrete particles, loading and unloading fuel into or out of the module is easier than if the fuel were present as conventional fuel elements. Also, extra reactivity need not be built into a reactor because fuel can be easily added or replaced, hence fuel inventory is reduced which represents a monetary savings. Advantages tied to reduced fuel inventory are improved breeding ratio and reduced and simplified reactor control equipment.

Another problem in using conventional fuel elements with a sodium coolant is that the coolant is opaque and relocation or replacement of fuel elements is very difficult. Where fuel elements are used, they have to be rotated within the core, since fuel burnup varies with core position. Rotating the fuel elements is a distinct problem, as mentioned above. When the fuel is in the form of discrete particles in an expanded bed, uniform burnup is easier to achieve because of particle mixing inherent in an expanded bed. So, also, temperature gradients can be more easily controlled than with conventional fuel elements and, in fact, there is generally no undesirable radial temperature gradient in an expanded bed of this type. Because uniform fuel burnup is attainable with an expanded bed, variable flow orificing is generally not needed. Since variable flow orificing requires more complex piping, its absence is a distinct advantage. So, too, zone loading is not necessarily required in an expanded bed. However, if it is desired, it can easily be accomplished.

Still other advantages of this expanded bed fuel module are the removal of fission gases produced during burnup by the fluidizing medium and the unrestricted flow of coolant through the tubes. Conventional reactors usually contain a multitude of internal structures which obstruct the flow of coolant. Use of an expanded bed does not result in only advantages and no disadvantages, but most disadvantages which do occur, such as poor heat transfer between coolant and fuel, can be overcome by proper design. In the case of poor heat transfer mentioned above, use of a corrugated coolant tube, which enables the use of thinner walls with more surface area, helps to remedy the problem.

Brief description of the drawings

The fuel system of this invention may be more readily understood by reference to the following drawings in which:

FIG. 1 is a cross-sectional view of a fuel module;
FIG. 2 is a view of the module of FIG. 1 taken along the line 2—2 of FIG. 1; and
FIG. 3 is an enlarged view of a portion of a distribution baffle.

Description of the preferred embodiment

With reference to FIGS. 1 and 2, fuel module 10 includes a shell defined by hexagonally shaped wall 11 and a coolant inlet 12 which is circular in cross section and has a reduced diameter as compared to wall 11. A pyramidal tube sheet 14 proximate the coolant inlet 12 is sealed to wall 11. Pyramidal tube sheet 14 has its apex downwardly disposed and has a central aperture 16 in communication with a tube fitting 17 extending downwardly therefrom. A plurality of coolant tubes 21 sealingly attached to tube sheet 14 extend vertically up module 10 and terminate at horizontal tube sheet 22. A pyramidal distributor plate 24 proximate tube sheet 14 but spaced therefrom away from coolant inlet 12 is sealed to wall 11 and has a plurality of apertures 25 through which coolant tubes 21 pass. As shown in FIG. 3, apertures 25 are large enough to permit not only coolant tubes 21 to pass therethrough but also slurry, as will later be explained. A plurality of horizontal distribution baffles 27, sealed to wall 11, are located intermediate distributor plate 24 and horizontal tube sheet 22. Coolant tubes 21 pass through apertures 29 in each of said baffles 27. Apertures 29, like apertures 25, are large enough to permit slurry as well as coolant tubes 21 to pass therethrough. A bed level control screen 30 is located near horizontal tube sheet 22. A plate containing a plurality of apertures for the passage of coolant tubes 21 and fluidizing medium would be a satisfactory alternate to screen 30. Header 31 is formed between tube sheet 22 and pyramidal top 32 which is sealed to wall 11.

Fluidizing medium inlet tube 33 enters module 10 at top 32 and extends vertically downward through module 10 to make a 180 degree curve which is connected to tube fitting 17. An eductor inlet tube 34 enters module 10 through top 32 and extends downwardly through the center of module 10, terminating inside tube fitting 17. A fluidizing medium outlet tube 36 leads from horizontal tube sheet 22 through apex 35 of top 32. A coolant outlet tube 37 exits from module 10 at top 32 and leads to heat exchange equipment (not shown). A conventional control rod 38 extends into module 10 from top 32.

In operation, a concentrated slurry of fuel particles, such as plutonium dioxide and uranium dioxide, and a fluidizing medium, such as liquid sodium, is prepared. The fuel particles may be metal or ceramics such as oxides or carbides. The fluidizing medium may be sodium, sodium-potassium, lithium or the like. Dioxides for fuel particles and sodium for fluidizing medium are preferred. The concentrated slurry is fed to module 10 through inlet 33 and is passed upwardly through tube fitting 17. When the proper amount of fissile material has been charged to module 10, the flow of concentrated slurry is discontinued and fluidizing medium is substituted therefor. The fluidizing sodium enters through inlet 33 and dilutes the concentrated slurry. The velocity of fluidizing sodium is sufficient to cause the particles to separate and form expanded bed 40 between distributor plate 24 and bed level control screen 30. Distributor plate 24 forms a base for bed 40 and ensures a uniform distribution of fluidizing medium across expanded bed 40. Bed level control screen 30 prevents the boiling or eddying usually present at the top of fluidized beds that is responsible for most of the particle carryover. While a few fuel particles pass through screen 30, most are retained in bed 40. In a steady-state situation, the incoming fluidizing sodium contains a sufficient number of fuel particles to replenish those lost through screen 30. Excess fluidizing sodium exits from module 10 through outlet tube 36 to eventually be returned through inlet tube 33.

Coolant, such as liquid sodium, enters module 10 through coolant inlet 12 and passes through coolant tubes 21 and exits from tubes 21 at horizontal tube sheet 22. Coolant leaves module 10 through coolant outlet 37 in top 32, passes to heat exchange equipment (not shown) and returns through coolant inlet 12.

From the above it is clear that loading fissile material into module 10 is comparatively simple. When it is desired to unload module 10, fluidizing medium is charged through eductor inlet tube 34 which causes the flow in fluidizing medium inlet tube 33 to reverse. Expanded bed 40 then drains through distribution baffles 27 and distributor plate 24 and is carried through fluidizing medium inlet tube 33 with the fluidizing medium.

The purposes of horizontal distribution baffles 27 are threefold. In case expanded bed 40 were to collapse due to loss of fluidizing medium, baffles 27 prevent excessive reactivity from being built up before safety devices can be activated by preventing rapid settling of fuel particles. Baffles 27 also act as spacer grids and as support for the relatively thin module walls 11.

While the absence of radial temperature gradients is one of the principal advantages of an expanded bed fuel system, baffles 27 enable an axial temperature gradient to exist in the bed. In a conventional fuel core a desirable axial temperature gradient exists. In a heated fluidized bed the particles circulate throughout the bed. This particle circulation would essentially eliminate the axial gradient. Baffles 27 prevent a great deal of the axial particle circulation normally present in fluidized beds. Without this particle circulation, an axial temperature gradient normal for conventional fuel cores can exist in the bed. An axial temperature gradient is important because the temperature at which expanded bed 40 operates is limited by the thermal stress produced in coolant tubes 21 by the difference in the temperature between bed 40 and the coolant inside tubes 21. If there were no axial temperature gradient in bed 40, the temperature of bed 40 would be limited by the temperature at which coolant enters tubes 21 at distributor plate 24. It is clear that the coolant temperature rises as the coolant proceeds up module 10. Only by changing the temperature of expanded bed 40 can the maximum difference in temperature between the bed 40 and the coolant be maintained. The use of a plurality of baffles 27 enables the maximum temperature difference between the coolant and the bed 40 to be maintained.

The following table sets out some of the design parameters of a 1000 mwe. mixed-oxide reactor.

| System: | Expanded bed |
|---|---|
| Sodium void worth, $\Delta K$ | +0.0046 |
| Doppler coefficient, $dK/dt$ | $5.5 \times 10^{-6}$/F. |
| Specific power: | |
|   Core U+Pu, kw./kg. | 77.5 |
|   Core fissile Pu, kw./kg. | 724 |
| Fuel mixture power density, kw./liter (25% overpower) | 1234 |
| Core power, mwt. | 2200 |
| Size: | |

| | |
|---|---|
| Core diameter, in. | 113.6 |
| Core height, in. | 60 |
| Temperature: | |
| Core inlet, °F. | 900 |
| Structural peak, °F. | 1400 |
| Max. bed Na temp., °F. (1600° F. limit) at 25% overpower | 1301 |
| Max. particle temp. at 25% overpower | 1304 |
| Core outlet, °F. | 1200 |
| Coolant: | |
| Sodium flow, lb./hr. | $83.4 \times 10^6$ |
| Core pressure drop, p.s.i. | 37 |
| Sodium velocity, ft./sec., max. | 37 |
| Control material | B4C |
| Fuel burnup, mwd./mt. oxide | 100,000 |
| Core loading: | |
| Core fissile Pu metal ~kg. | 3,037 |
| Core metal ~kg. | 28,740 |
| Core ceramic ~kg. | 32,600 |
| Fuel composition: | |
| Plutonium composition, w/o: | |
| Pu-239 | 75 |
| 240 | 20 |
| 241 | 5 |
| Uranium/plutonium ratio (kg. U/total kg. Pu) | 6.3 |
| Core volume | 9988.3 |
| Fuel fraction (solid | 0.312 |
| Sodium fraction | 0.570 |
| Steel fraction | 0.119 |
| Assemblies: | |
| Number of assemblies/core | 61 |
| Assembly across flats, in. | 13.8 |
| Coolant tube pitch, in. | 0.37 |
| Coolant tube OD, in. | 0.25 |
| Coolant tube ID, in. | 0.22 |
| Coolant tubes/assembly | 1334 |
| Fuel material | mixed oxide |
| Density percent of theoretical | 95 |
| Density, gm./cc. | 11.0 |
| Fuel form | Sph. particles |
| Particle diameter, in. (mean) | 0.008 |
| Mode of operation, fuel circulation | Continuous |
| Peak to ave. power [1] | 2.5 |
| Maximum heat flux, B.t.u./hr.-ft.[2] | $1 \times 10^6$ |
| Structural: | |
| Material | 304 SS |
| Allowable fuel thermal stress, p.s.i. (max) | 25,000 |
| Paste volume fraction ratio fuel/sodium | 56/44 |

[1] Assumes for thermal and hydraulic analyses.

It will be understood that the invention is not to be limited to the details given herein but that it may be modified within the scope of the appended claims.

The embodiments of the invention in which an exclusive property or privilege is claimed are defined as follows:

1. A fuel module for a fast breeder nuclear reactor comprising a shell, said shell having:
    a fluidizing medium inlet;
    a fluidizing medium outlet at the top of the shell;
    a coolant inlet at the bottom of the shell;
    a coolant outlet at the top of the shell;
    a first tube sheet proximate the bottom of the shell, said tube sheet having an aperture in communication with said fluidizing medium inlet;
    a distributor plate proximate the first tube sheet and positioned between the first tube sheet and the top of said shell;
    a second tube sheet proximate the top of said shell;
    a plurality of coolant tubes extending vertically through said shell from the first tube sheet to the second tube sheet and in communication with the coolant inlet and the coolant outlet;
    means for admitting a slurry containing fissile and/or fertile particles into said module through said fluidizing medium inlet and establishing and maintaining an expanded bed of said fissile and/or fertile particles above the distributor plate; and
    means for producing an axial temperature gradient in the expanded bed.

2. The fuel module of claim 1 wherein the means for producing an axial temperature gradient comprise a plurality of horizontal distribution baffles spaced one from the other in the shell.

3. The fuel module of claim 2 wherein the fluidizing medium inlet enters said shell near the top thereof and extends downwardly through the module to said first tube sheet.

4. The fuel module of claim 3 and further comprising an eductor tube entering said shell at the top thereof, extending downwardly therethrough and terminating within said aperture in said first tube sheet.

5. The fuel module of claim 4 wherein the distribution baffles have apertures therein with larger diameters than the coolant tubes.

6. The fuel module of claim 5 wherein the first tube sheet and the distribution plate are pyramidally shaped with their apexes downwardly disposed.

7. The module of claim 6 and further comprising a screen horizontally disposed in and near the top of said shell.

8. The fuel module of claim 7 wherein the fissile and/or fertile particles contain uranium and/or plutonium and the means for establishing and maintaining a fluidized bed is by passing a liquid metal upwardly through said fissile and/or fertile particles.

9. The fuel module of claim 8 wherein the fissile and/or fertile particles are uranium dioxide and/or plutonium dioxide and the liquid metal is sodium.

10. A fuel module for a fast breeder reactor comprising:
    a vertically disposed shell having a coolant inlet at the bottom of the shell, a coolant outlet pipe at the top of the shell, a fluidizing medium inlet tube which enters the shell at the top and extends downwardly therein to a point near the bottom, and a fluidizing medium outlet tube at the top of the shell, said shell containing
    a lower pyramidal tube sheet having its apex pointed down disposed near the bottom of the shell, a downwardly extending tube fitting connected to said apex, said fluidizing medium inlet tube being connected to said fitting, an upper horizontal tube sheet at the top of the shell, and coolant tubes extending between the upper and lower tube sheets;
    a pyramidal distribution plate disposed above the lower tube sheet having apertures therein for the coolant tubes to pass through, said apertures being larger than the coolant tubes;
    a plurality of spaced horizontal baffles extending across the shell above the distribution plate and having apertures therein for the coolant tubes to pass through, said apertures being larger than the coolant tubes;
    a horizontal bed level control screen extending across the shell near the top thereof;
    an eductor tube extending vertically through the shell from the top and terminating in the tube fitting;
    a control rod disposed for vertical movement in the shell, and a slurry of uranium dioxide particles in sodium disposed in said shell between said distribution plate and said bed level control plate.

References Cited

UNITED STATES PATENTS 3,285,823  11/1966  McDaniel et al. _____ 176—47

CARL D. QUARFORTH, *Primary Examiner.*

H. E. BEHREND, *Assistant Examiner.*